(12) United States Patent
Rey (10) Patent No.: US 12,477,496 B2
(45) Date of Patent: Nov. 18, 2025

(54) ESTIMATING TIME OF DEPARTURE FOR ROUND TRIP TIME WITH RATE ADAPTATION

(71) Applicant: Cypress Semiconductor Corporation, San Jose, CA (US)

(72) Inventor: Claudio Rey, Chandler, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 366 days.

(21) Appl. No.: 18/319,385

(22) Filed: May 17, 2023

(65) Prior Publication Data

US 2024/0389044 A1    Nov. 21, 2024

(51) Int. Cl.
*H04W 56/00* (2009.01)
*H04L 7/033* (2006.01)

(52) U.S. Cl.
CPC ......... *H04W 56/0065* (2013.01); *H04L 7/033* (2013.01)

(58) Field of Classification Search
CPC ............................ H04W 56/0065; H04L 7/033
See application file for complete search history.

(56) References Cited

U.S. PATENT DOCUMENTS

| | | | |
|---|---|---|---|
| 7,929,927 B2 | 4/2011 | Norris et al. | |
| 9,794,056 B1 | 10/2017 | Tamma et al. | |
| 9,893,877 B2 * | 2/2018 | Anvekar | H04L 7/0029 |
| 10,368,174 B2 * | 7/2019 | Mitchler | H04R 25/554 |
| 10,530,905 B1 | 1/2020 | Rey et al. | |
| 10,819,544 B2 | 10/2020 | Stanciu et al. | |
| 10,862,505 B1 | 12/2020 | Rey | |
| 10,862,728 B1 | 12/2020 | Rey et al. | |
| 10,862,729 B1 | 12/2020 | Rey et al. | |
| 10,965,290 B2 * | 3/2021 | Tajalli | H04L 25/0272 |
| 11,545,982 B2 | 1/2023 | Perin et al. | |
| 11,621,898 B2 | 4/2023 | Stanciu et al. | |
| 12,003,354 B2 * | 6/2024 | Simpson | H04L 7/0087 |

FOREIGN PATENT DOCUMENTS

| | | |
|---|---|---|
| EP | 3264701 B1 | 2/2019 |
| EP | 3706380 A1 | 9/2020 |
| EP | 3731478 A3 | 10/2020 |
| EP | 3737055 A1 | 11/2020 |
| EP | 4064568 A1 | 9/2022 |

* cited by examiner

Primary Examiner — Chandrahas B Patel (57) ABSTRACT

A device includes a transmitter to generate a sampled stream of data for a packet at a first sample rate. A data re-sampling circuit includes a re-timer engine to determine, using a fractional rate between the first sample rate and a crystal oscillator (XO)-divided sample rate, re-timer values including a difference between pulses of a pseudo-clock corresponding to the XO-integer-divided sample rate and closest corresponding pulses of a clock corresponding to the first sample rate, and a time-shifting circuit to re-sample data values of the sampled stream of data associated with locations of the plurality of re-timer values. A comparator circuit uses the re-sampled data values to match the re-sampled data values to a corresponding data value detected in the data pattern in the frame delimiter. A timing logic uses the plurality of re-timer values and the location of the marker in the data pattern in a timing calculation.

20 Claims, 5 Drawing Sheets

ESTIMATING TIME OF DEPARTURE FOR ROUND TRIP TIME WITH RATE ADAPTATION

TECHNICAL FIELD

This disclosure relates to wireless networks and, more specifically, to estimating time of departure for round trip time with rate adaptation between wireless devices.

BACKGROUND

Personal area networks (PANs), such as Bluetooth® (BT), Bluetooth® Low Energy (BLE), Zigbee®, infrared, and the like, provide a wireless connection for various personal, industrial, scientific, and medical applications. PANs generally use a packet-based protocol and have an architecture that includes central devices (CDs) and peripheral devices (PDs). A CD can communicate with multiple PDs.

Some PANs, such as those based on BLE technology, have communication ranges similar to those of BT networks but have considerably smaller power consumption and cost. Further, BLE devices often remain in a sleep mode and transition to an active mode when data communication is about to happen. BLE protocol also supports mesh networking, in which data can flow over multiple paths, and which does not rely on a rigid hierarchical structure of devices, often allowing the same devices to serve as CDs or PDs, depending on particular network conditions and topology.

Additionally, some PANs are used in wireless devices (e.g., CDs) that are included in or associated with lock mechanisms of enclosures (such as a residence, a vehicle, a garage, a shed, or the like) and used to provide secure keyless access to persons in possession of a keyed PD, e.g., also referred to as keyless entry. A keyed PD (which could be a mobile device such as a smartphone, for example) may transmit a particular data pattern within a frame delimiter of a packet. The wireless CD device associated with an enclosure may then perform frame synchronization detection to verify that the particular data pattern matches an expected data pattern used to, in part, provide a level of security to the keyless entry.

DETAILED DESCRIPTION

The following description sets forth numerous specific details, such as examples of specific systems, devices, components, methods, and so forth, in order to provide a good understanding of various embodiments of frame synchronization detection between wireless devices associated with a PAN. The disclosed principles may generally be applied to (Gaussian) Frequency Shift Keying ((G)FSK) modulation. Frame synchronization (or frame synch) detection may refer to detecting a frame delimiter, also referred to as a start frame delimiter (SFD), in a network packet identifying or signaling that data is to follow within a frame of the packet.

In certain PAN devices, frame synchronization detection can be used to aid in communication between wireless devices by identifying or signaling the data (i.e., payload data) that is to follow in a packet. Optionally, frame synchronization detection can also identify the sender of the packet. In certain PAN devices, frame synchronization can be used as part of BLE distance estimation. BLE distance estimation is achieved through a phase-based distance ranging method, through packet exchanges in round trip time (RTT) estimation, or a combination thereof to provide localization between wireless devices. In one example, data patterns (e.g., of digital "0 s" and "1 s") are used in RTT estimation to estimate the time of arrival (ToA) of a packet. In another example, data patterns are used in RTT estimation to estimate the time of departure (ToD) of a packet. In another example, BLE distance estimation can use the frequency estimated during the RTT estimation to synchronize the BLE distance estimation device to other BLE distance estimation devices through the correction of clocking errors and to estimate the frequency offset between devices. Additionally, BLE distance estimation can use data patterns to estimate frequency for use in security features, such as intrusion detection models.

Frame synchronization detection is best carried out at a sample rate that is a simple multiple (e.g., 4, 6, 8, 12 megahertz (MHz)) of the data symbol rate (e.g., 1 or 2 megabits per second (Mbps)). The sample rate and the data symbol rate are typically a divided (e.g., sampling) rate of the crystal oscillator (XO) frequency (e.g., 24, 32, or 48 MHz). The subsequent processing of the data symbols may be straightforward in being performed at known XO-integer-divided sample rates, and data patterns (e.g., of digital "0 s" and "1 s") can be more easily correlated using bit decisions according to Boolean logic. Alternatively, signed soft symbols may be used to obtain more accurate results in which case the correlation can be described as a number of summations and subtractions. Thus, in practice, a time of departure (ToD) estimate of a packet is as accurate as the closest edge of a transmitter clock (coarse timing) or as accurate as a fraction of a period of the transmitter clock (fractional timing). Some deficiencies of this approach include that transmitters that operate at XO-integer-divided sample rates experience significant radio interference issues. Such radio interference issues can impact transmitter sensitization.

Accordingly, to avoid these radio interference issues, the transmitter of the wireless device can instead use a sample rate that is a divided sample rate from a local oscillator (LO) frequency. The LO frequency is often (although not necessarily always) a non-multiple of the modulation bit rate, e.g., of an XO-integer-divided sample rate. While this approach avoids some transmitter de-sensing issues, this solution also requires a rate adaptation between the LO frequency-derived sample rates and XO-integer-divided sample rates. Such adaptation typically uses a first-in-first-out (FIFO) buffer to transfer the data between domains. This solution is not entirely satisfactory, as ToD measurement requires a precise, controllable latency through the FIFO buffer. Measuring an accurate ToD can then, in turn, be used for estimating the RTT of a packet. For example, the RTT can be estimated with the following example mathematical equation, which computes a difference between the ToA and ToD of an initiator device of a transmitter and the difference between the ToA and ToD of a reflector device of the transmitter:

$$RTT=(ToA_{initiator}-ToD_{initiator})-(ToD_{reflector}-ToA_{reflector})$$

To resolve the deficiencies experienced with rate adaptations when resampling packets sent at a LO-based (or original) sample rate to an XO-integer-divided sample rate, a transmitter can generate a sampled stream of data for a packet and generate a ToD marker at a location in a data pattern in a frame delimiter of the packet. After the data is transferred between domains using the FIFO buffer, the location of the ToD marker can be corrected, as described further herein. In this scenario, a data re-sampling circuit creates a clock using a pulse insertion that, on average, approximates a rate that is a multiple of the data symbol rate. An approximation of a desirable multiple of the data symbol rate may be, e.g., 8, 6, or 4× the data symbol rate and a divided XO rate. For example, the symbol rate may be at 1 MHz, and the XO frequency may be 24 MHz, while the average rate approximates 6 MHz or the XO sample rate divided by 4. Thus, the XO-integer-divided sample rate averages a fraction of a frequency of an integer-divided XO sample rate. These values are provided only by way of example for purposes of explanation.

According to some embodiments, a transmitter generates a sampled stream of data for a packet at a first sample rate corresponding to a first frequency. The transmitter further generates a marker (e.g., a ToD marker) at a location in a data pattern in a frame delimiter of the packet. In at least some embodiments, the data re-sampling circuit includes a re-timer engine to determine, using a fractional conversion ratio between the first sample rate and a crystal oscillator (XO)-integer-divided sample rate, a set of re-timer values comprising differences between pulses of a pseudo-clock corresponding to the XO-integer-divided sample rate and closest corresponding pulses of a clock corresponding to the first sample rate. The re-sampling circuit may further include a time-shifting circuit to re-sample data values of the sampled stream of data associated with locations of the plurality of re-timer values. In these embodiments, a comparator circuit coupled to the re-sampling circuit may be adapted to use the re-sampled data values to match the re-sampled data values to a corresponding data value detected in the data pattern in the frame delimiter of the packet. The re-sampling circuit may further be coupled to a timing logic that may be adapted to use the set of re-timer values and the location of the marker in the data pattern in the frame delimiter of the packet in a timing calculation (e.g., in RTT estimation), In at least some embodiments, the timing calculation may include performing a correction to the location of the marker to generate a corrected marker, which can be used in estimating RTT as described herein. Additional implementation details will be discussed with reference to the current Figures.

The present disclosure includes a number of advantages. In particular, the transmitter can still operate at a non-integer sample rate (e.g., non-XO-integer-divided sample rate) and avoid the radio interference issues discussed previously while being able to keep track of the location of the ToD marker and thus use the ToD marker in estimating an accurate RTT, as described in more details herein.

Figure 1A:
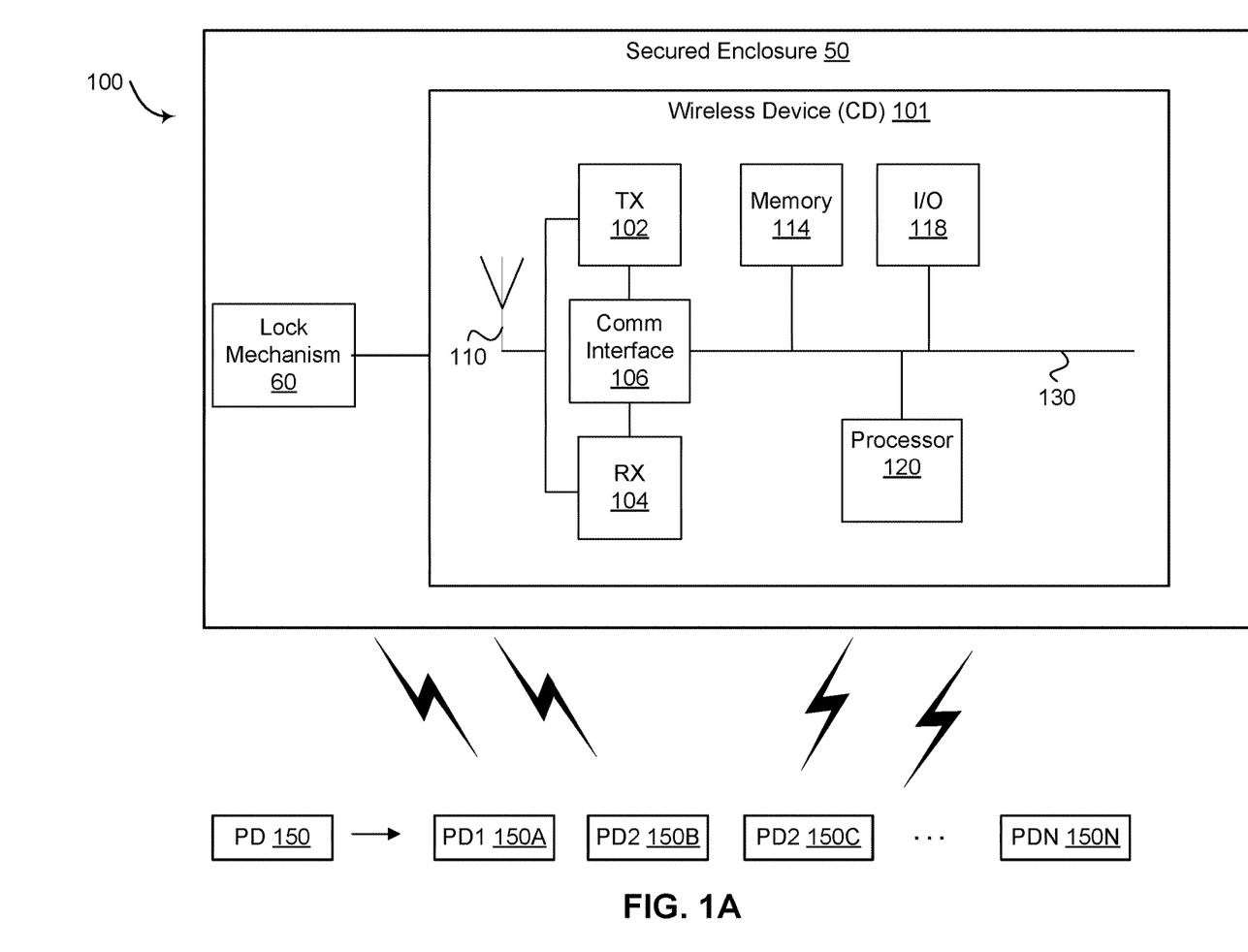
FIG. 1A is a block diagram of a system useable for estimating time of departure for round trip time with rate adaptation between a wireless device acting as a CD and a wireless device acting as a PD according to an example embodiment.

FIG. 1A is a block diagram of a system 100 useable for estimating time of departure (ToD) for round trip time with rate adaptation between a wireless device 101 acting as a CD and a wireless device 150 acting as a PD according to an example embodiment. The system 100 may include a secured enclosure 50, e.g., that is secured using a lock mechanism 60, where a wireless device is adapted to gain access to the secured enclosure via the lock mechanism 60. The secured enclosure 50 may be, for example, a vehicle, a building, a residence, a garage, a shed, a vault, or the like. The secured enclosure 50 may also be a computer system, industrial equipment, or other items requiring secured access via the lock mechanism 60, which may be a digital locking mechanism, for example. In some embodiments, the lock mechanism 60 is integrated together with the wireless device 101.

In various embodiments, the wireless device 150 is any one of multiple peripheral wireless devices PD1 150A . . . . PDN 150N, as the wireless device 101 may be adapted to communicate with any or all of the peripheral wireless devices PD1 150A . . . . PDN 150N. In differing embodiments, the wireless device 150 is a mobile device such as a mobile phone, a smartphone, a pager, an electronic transceiver, a tablet, or the like. In these embodiments, the wireless device 150 may be adapted to gain access to the secured enclosure 50 by transmitting data, including a frame delimiter and an enclosed frame.

In at least some embodiments, the wireless device 101 includes, but is not limited to, a transmitter 102 or TX (e.g., a PAN transmitter), a receiver 104 or RX (e.g., a PAN receiver), a communications interface 106, one or more antenna 110, a memory 114, one or more input/output (I/O)) devices 118 (such as a display screen, a touch screen, a keypad, and the like), and a processor 120. These components may all be coupled to a communications bus 130.

In some embodiments, a separate antenna is employed for each of the transmitter 102 and receiver 104, and so the antenna 110 is illustrated for simplicity. In at least some embodiments, the memory 114 may include storage to store instructions executable by the processor 120 and/or data generated by the communication interface 106. In various embodiments, the one or more antenna (such as the antenna 110) described herein within various devices may be used for PAN-based frequency bands, e.g., Bluetooth® (BT), BLE, Wi-Fi®, Zigbee®, Z-wave™, and the like.

In some embodiments, the communications interface 106 is integrated with the transmitter 102 and the receiver 104, e.g., as a RF front-end (RFFE) circuitry of the wireless device 101. The communication interface 106 may coordinate, as directed by the processor 120, to request/receive packets from the peripheral wireless device 150. The communications interface 106 may further process data symbols received by the receiver 104 in a way that the processor 120 can perform further processing, including verifying a correlation between phase-based samples of data values obtained from a frame of a packet and an expected data pattern as part of a security protocol, as discussed herein.

Figure 1B:
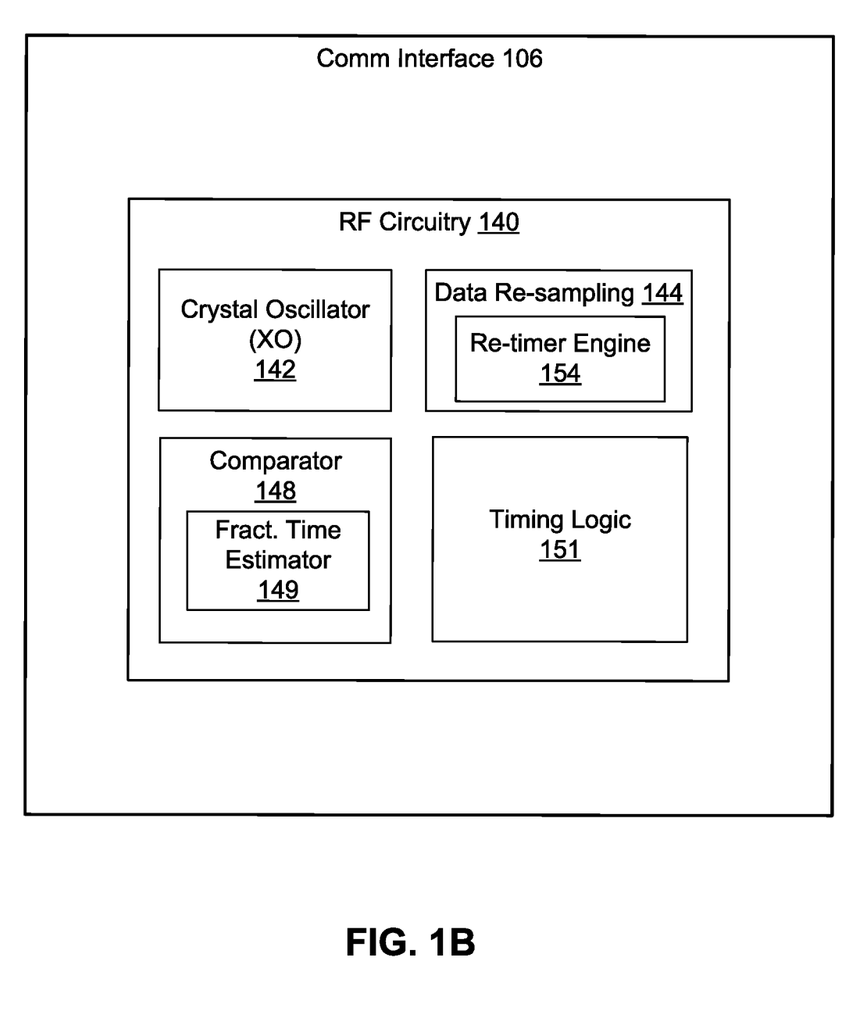
FIG. 1B is a simplified block diagram of the communication interface of the CD-based wireless device of FIG. 1A according to at least one embodiment.

FIG. 1B is a simplified block diagram of the communication interface 106 of the wireless device 101 of FIG. 1A according to at least one embodiment.

In various embodiments, the communication interface 106 includes RF circuitry 140, although the RF circuitry 140 discussed herein may also be coupled with the communication interface 106 and thus be located elsewhere within the frontend of the wireless device 101. In at least some embodiments, the RF circuitry 140 includes (or is coupled with) a crystal oscillator (XO) 142 and includes a data re-sampling circuit 144, a comparator circuit 148, and a timing logic 151. The data re-sampling circuit 144 may include a re-timer engine 154 to generate (or cause generation of) the re-timer values that will be used by the comparator circuit 148 to perform frame synchronization detection. The comparator circuit 148 may also include a fractional time estimator 149.

The XO 142 may provide a clock to govern sampling and processing in an XO-based design, but the direct conversion of data in the XO-based frequency domain carries the disadvantages that were previously discussed. In some embodiments, the RF circuitry is implemented as a programmable processor, such as an application-specific integrated circuit (ASIC), field programmable gate array (FPGA), a processing unit (such as a CPU or a GPU), or other microprocessor devices that may include a combination of circuit-based hardware, logic, firmware, and/or software.

In various embodiments, the data re-sampling circuit 144 is configured to resample input data, which has already been sampled by the transmitter 102 at a local oscillator (LO) frequency-derived sample rate to an XO frequency-derived pseudo sample rate. This XO frequency-derived pseudo sample rate may be governed by a pseudo-clock generated to, on average, correspond to an XO-integer-divided frequency, such as 4 MHz, 6 MHz, 12 MHz, 24 MHz, or the like. The comparator circuit 148 may use the pseudo-clock to match the re-sampled data values to a corresponding data value detected in the data pattern in the frame delimiter of the packet. The timing logic 151 may use the re-timer values and the location of a ToD marker in the data pattern in the frame delimiter of the packet in a timing calculation, e.g., RTT estimation. For example, the timing logic 151 may generate a corrected ToD marker using the re-timer values, which may be used in RTT estimation. In some embodiments, the timing logic 151 may be coupled to the receiver 104.

Figure 2:
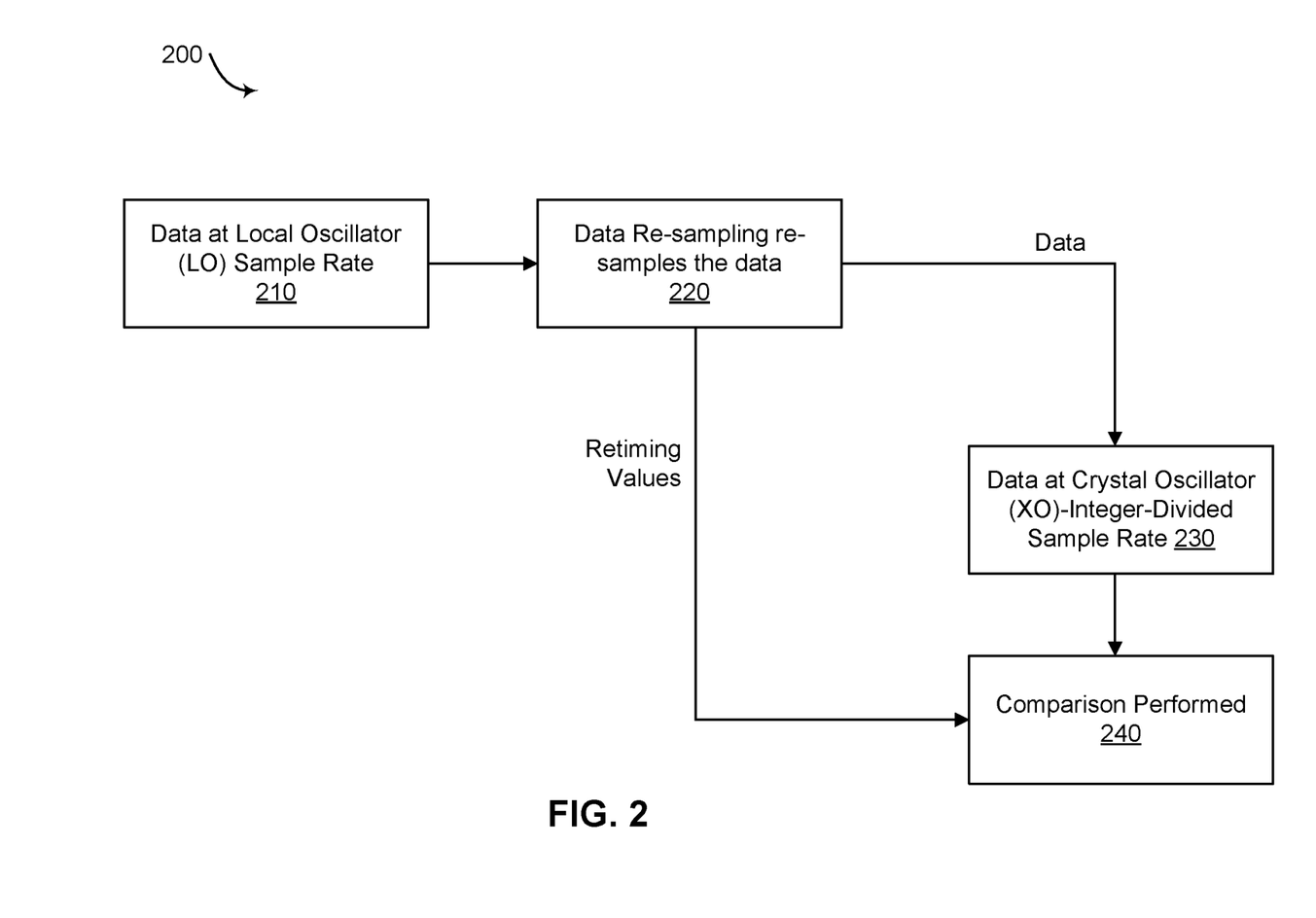
FIG. 2 is a flow diagram of a method of estimating time of departure for a round trip time (RTT) with rate adaptation according to at least one embodiment.

FIG. 2 is a flow diagram of a method 200 of estimating time of departure (ToD) for round trip time with rate adaptation according to at least one embodiment. The method 200 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the communication interface 106 and potentially by a combination of the communication interface 106 and the processor 120.

At operation 210, data of a packet is sampled at a local oscillator (LO) sample rate. This LO sample rate is not specific to any XO integer-divided frequency. Just as an example for purposes of explanation, assume the LO sample rate is 6.42 MHz.

At operation 220, the data re-sampling circuit 144 resamples the data in a way to increase (interpolation) or decrease (decimation) the data sample rate. The sample rate of the data output from the data re-sampling circuit 144 can then be, on average, an XO-integer-divided sample rate, thus corresponding to a "pseudo" clock at an XO-integer-divided frequency. Just an example for purposes of explanation, assume the XO-integer-divided sample rate is 6.0 MHz, thus slightly slower than the LO-divided sample rate.

At operation 220, the data re-sampling circuit 144 (e.g., the re-timer engine 154) may also determine re-timer values using a fractional rate between the LO-divided sample rate and the XO-integer-divided sample rate, e.g., as a difference between pulses of the pseudo-clock corresponding to the XO-integer-divided sample rate and closest corresponding pulses of a clock corresponding to the LO divided sample rate. These re-timer values may be provided to the comparator circuit 148.

At operation 220, the data re-sampling circuit 144 may re-sample data values of the sampled stream of data associated with locations of the re-timer values, and also provide these re-sampled data values to the comparator circuit 148. The functioning of the data re-sampling circuit 144, including the generation of the pseudo-clock, will be described in more detail.

At operation 230, the data (e.g., re-sampled data values) at the XO-integer-divided sample rate is provided to the comparator circuit 148.

At operation 240, a comparison is performed, by the comparator circuit 148, between a data pattern within a frame delimiter of the packet and an expected data pattern. More specifically, the comparator circuit 148 may use the re-sampled data values, the pseudo-clock, and the re-timer values to match the re-sampled data values to a corresponding data value detected in the data pattern in the frame delimiter of the packet. In some embodiments, the data value detected in the data pattern in the frame delimiter of the packet can be a ToD marker, which can be used in a timing calculation, such as RTT estimation, as described herein.

Figure 3:
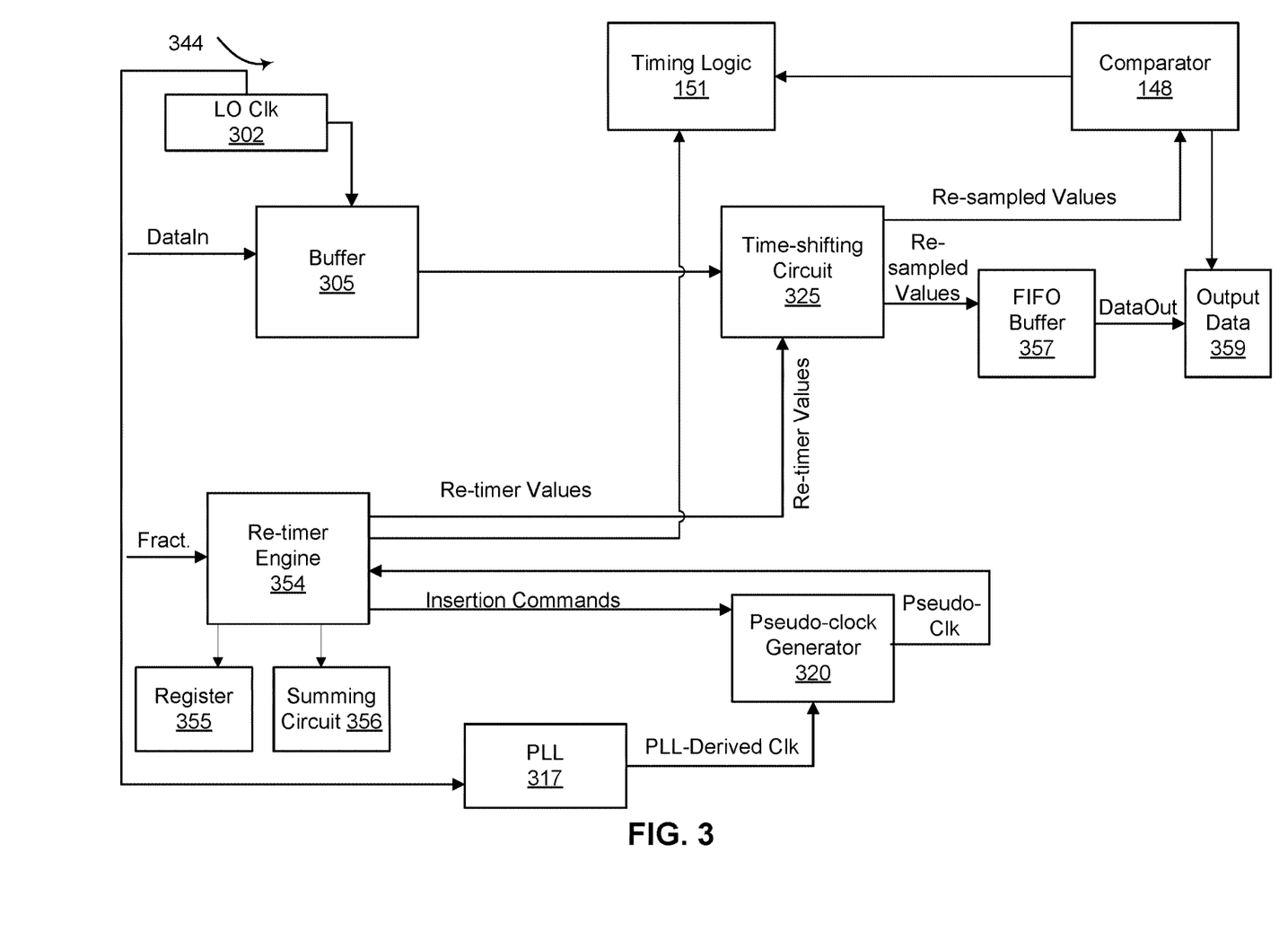
FIG. 3 is a block diagram of a data re-sampling circuit of a CD according to at least one embodiment.

FIG. 3 is a block diagram of a data re-sampling circuit 344 of a CD according to at least one embodiment. Timing and data generated by the data re-sampling circuit 344 may be provided to the comparator circuit 148 (FIG. 1B) and the timing logic 151 (FIG. 1B). In at least one embodiment, the data re-sampling circuit 344 is the data re-sampling circuit 144 of FIG. 1B.

In at least some embodiments, the data re-sampling circuit 344 includes an LO clock 302, a buffer 305, a phase-locked loop (PLL) 317, a pseudo-clock generator 320, a time-shifting circuit 325, a re-timer engine 354. In some embodiments, the PLL 317 is located elsewhere in the communication interface 106 or frontend of the wireless device 101, e.g., it need not be integrated within the data re-sampling circuit 344. In at least one embodiment, the re-timer engine 354 is the re-timer engine 154 of FIG. 1B.

In various embodiments, the buffer 305 includes a delay line to sample the input data (e.g., sampled stream of data from the transmitter 102) using a LO-integer-divided clock 302, which is compatible with the frequency of the local oscillator (LO) used by the transmitter 102. In these embodiments, the buffer 305 outputs the data in a delayed sampled data stream corresponding to a first frequency derived from the LO by a simple integer divider.

In at least some embodiments, the re-timer engine 354 tracks the timing relationship of the data between the input sampling rate (of the data) and the XO-integer-divided sample rate. For example, the fractional rate can be, e.g., the fractional difference between 6.42 Msps (Megasamples per second) and 6.00 Msps, which is −0.0660. The re-timer engine 354 may then use this fractional rate to determine multiple re-timer values that are a difference between pulses of a pseudo-clock corresponding to the XO-integer-divided sample rate and closest corresponding pulses of a clock corresponding to the subsequent sample rate, e.g., the LO clock 302. The re-timer values may thus estimate the time shift or time interpolation of the sampled data at the first sample rate required to output data at the XO-integer-divided sample rate. In these embodiments, the re-timer engine 354 provides the re-timer values to the time-shifting circuit 325, which re-timer values are discussed later as being equivalent to fractional interpolation commands to the time-shifting circuit 325. In some embodiments, the re-timer engine 354 provides the re-timer values to a timing logic 151 (FIG. 1B). In some embodiments, the re-timer engine 354 includes a register 355 to store a re-timer value of the multiple re-timer values. In some embodiments, the register 355 can buffer multiple re-timer values. The re-timer engine 354 may further include a summing circuit 356 to add the fractional conversion ratio to the re-timer value to determine a fractional re-timer value.

In some embodiments, the pseudo-clock generator 320 is adapted to generate the pseudo-clock referred to previously. The PLL 317 may, for example, generate a PLL clock derived based on the LO clock 302. The PLL 317 may be adapted to use the LO clock 302 as an input reference onto which the PLL 317 locks in frequency and phase to provide as accurate a PLL-based clock as possible at the non-integer sample rate.

In these embodiments, the pseudo-clock generator 320 receives the LO-integer-divided clock and inserts a pulse from the LO-integer-divided clock in response to each insertion command. In some embodiments, the re-timer engine 354 sends (e.g., issues and/or transmits) the insertion command to the pseudo-clock generator 320, where the insertion command is an indication to insert a pulse into the PLL clock. In these embodiments, the pseudo-clock generator 320 further generates the pseudo-clock as the PLL, clock with the inserted pulses, the pseudo-clock corresponding to, on average, the XO-integer-divided sample rate.

In various embodiments, the time-shifting circuit 325 is configured to re-sample data values (e.g., via interpolation) of the incoming sampled stream of data based on re-timer commands, e.g., re-timer values, which function as fractional interpolation commands. To perform this function, the time-shifting circuit 325 may receive the re-timer values from the re-timer engine 354 and the pseudo-clock from the pseudo-clock generator 320. In some embodiments, the time-shifting circuit 325 includes multiple digital fractional delay filters that re-sample (or interpolate), using the pseudo-clock, the data values based on corresponding ones of the multiple re-timer values. In some embodiments, the time-shifting circuit 325 provides the re-sampled data values to the comparator circuit 148.

In various embodiments, the FIFO buffer 357 is configured to receive the re-sampled data values and transfer the data values between domains (e.g., between LO frequency-derived sample rates and XO-integer-divided sample rates). In various embodiments, the output data 359 from the FIFO buffer 357 is used by the comparator circuit 148 to match the re-sampled data values to a corresponding data value detected in the data pattern in the frame delimiter of the packet. In various embodiments, the re-timer values and the output data 359 from the FIFO buffer 357 can be used by the timing logic 151 in performing a timing calculation. In some embodiments, the timing calculation can be an RTT estimation. In some embodiments, the timing calculation can be performed on a receiver (e.g., the receiver 104 of FIG. 1). In some embodiments, performing the timing calculation can include generating a corrected ToD marker, e.g., performing a correction, using the re-timer values, to the location of the marker in the data pattern in the frame delimiter of the packet.

Figure 4:
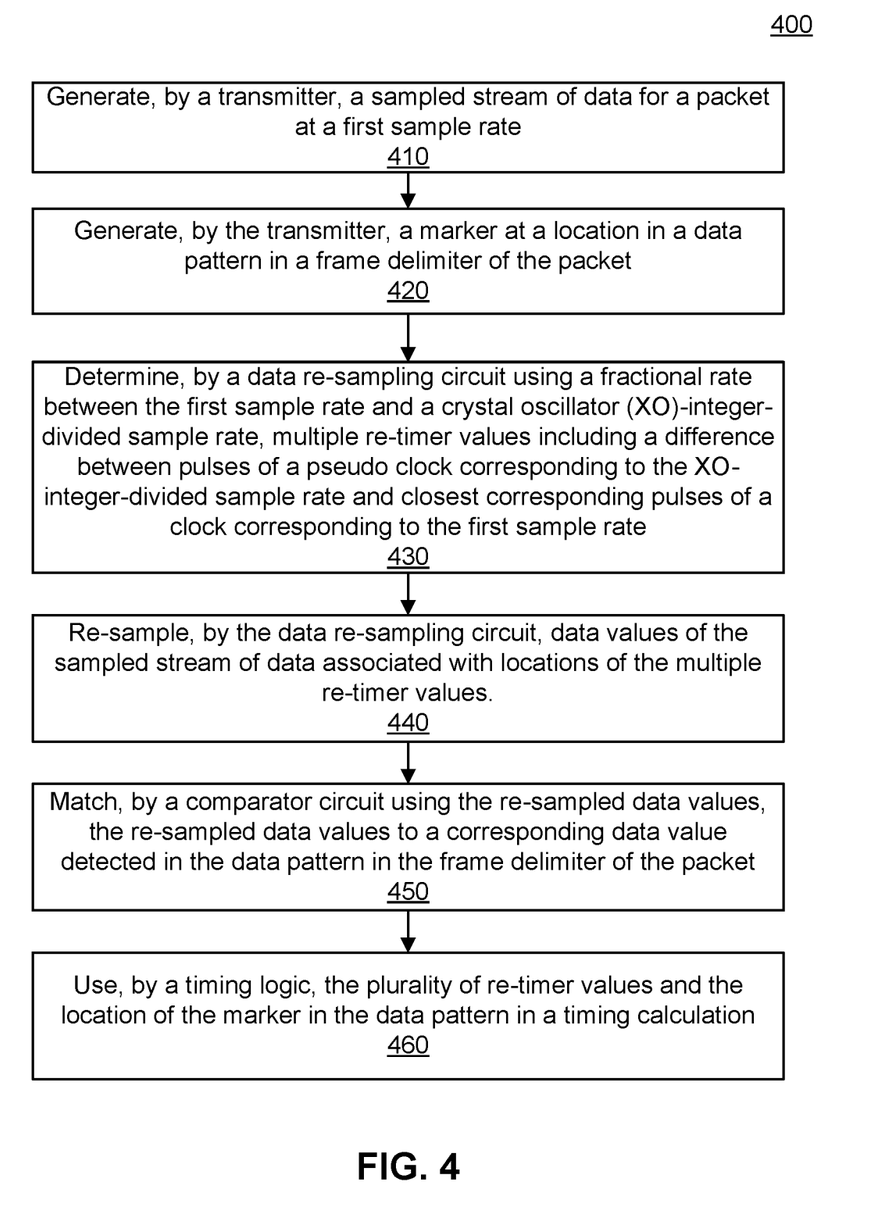
FIG. 4 is a flow diagram of a method of estimating time of departure for round trip time with rate adaptation according to various embodiments.

FIG. 4 is a flow diagram of a method of estimating time of departure (ToD) for RTT with rate adaptation according to at least one embodiment. The method 400 may be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the RF circuitry 140 and potentially by a combination of the communication interface 106 and the processor 120 (FIG. 1A).

At operation 410, a transmitter (e.g., the transmitter 102 of FIG. 1A) generates a sampled stream of data from a packet at a first sample rate. In some embodiments, the first sample rate corresponds to a first frequency, wherein the packet is to be transmitted to a receiver over a channel at the first frequency using an antenna (e.g., the antenna 110 of FIG. 1A). In some embodiments, the first sample rate is a non-integer sample rate.

At operation 420, the transmitter generates a marker (e.g., a ToD marker) at a location in a data pattern in a frame delimiter of the packet. In some embodiments, the marker is a pointer to the location in the data pattern to indicate the ToD. In some embodiments, the marker corresponds to a ToD annotation in the data pattern in the frame delimiter of the packet.

At operation 430, the processing logic (e.g., the data re-sampling circuit 144 of FIG. 1B) determines, using a fractional rate between the first sample rate and a crystal oscillator (XO)-integer-divided sample rate, a plurality of re-timer values comprising a difference between pulses of a pseudo-clock corresponding to the XO-integer-divided sample rate and closest corresponding pulses of a clock corresponding to the first sample rate. In some embodiments, the XO-integer-divided sample rate averages a fraction of a frequency of the integer-divided XO sample rate.

At operation 440, the processing logic (e.g., the data re-sampling circuit 144) re-samples data values of the sampled stream of data associated with locations of the plurality of re-timer values. In some embodiments, the processing logic obtains quadrature (IQ) values of the re-sampled data values.

At operation 450, the processing logic (e.g., the comparator circuit 148) matches, using the re-sampled data values, the re-sampled data values to a corresponding data value detected in the data pattern in the frame delimiter of the packet (e.g., the output data 359 of FIG. 3). In some embodiments, the processing logic matches the re-sampled data values to a corresponding data value detected in the data pattern by comparing the IQ value of the re-sampled data values to the IQ value of the data comprising the frame delimiter of the packet. In some embodiments, detecting a match between one or more of the re-sampled data values to a corresponding data value of the packet is indicative of detecting the marker generated by the transmitter 102 at operation 410 (e.g., the ToD marker). In some embodiments, the processing logic matches the re-sampled data values to a corresponding data value detected in the data pattern in the frame delimiter of the packet in response to determining that a threshold period of time is not satisfied (e.g., that a period of time for the matching has not expired). In some embodiments, the threshold period of time can be set during a design phase of the device based on offline testing and experimental data.

At operation 460, the processing logic (e.g., the timing logic 151) uses the plurality of re-timer values and the location of the marker (e.g., the marker generated by the transmitter 102 at operation 410) in the data pattern in the frame delimiter of the packet in a timing calculation. In some embodiments, the timing calculation includes modifying the location of the marker using one or more of the plurality of re-timer values. For example, modifying the location of the marker can include adding the one or more re-timer values to a value of the marker. In some embodiments, the corrected location of the marker can be used as a corrected ToD marker. In some embodiments, the corrected ToD marker can be used in estimating RTT, such as in frame synchronization detection, as described herein.

It will be apparent to one skilled in the art that at least some embodiments may be practiced without these specific details. In other instances, well-known components, elements, or methods are not described in detail or are presented in a simple block diagram format in order to avoid unnecessarily obscuring the subject matter described herein. Thus, the specific details set forth hereinafter are merely exemplary. Particular implementations may vary from these exemplary details and still be contemplated to be within the spirit and scope of the present embodiments.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

Certain embodiments may be implemented by firmware instructions stored on a non-transitory computer-readable medium. e.g., such as volatile memory and/or non-volatile memory. These instructions may be used to program and/or configure one or more devices that include processors (e.g., CPUs) or equivalents thereof (e.g., such as processing cores, processing engines, microcontrollers, and the like), so that when executed by the processor(s) or the equivalents thereof, the instructions cause the device(s) to perform the described operations for estimating time of departure for RTT with rate adaptation as described herein. The non-transitory computer-readable storage medium may include, but is not limited to, electromagnetic storage medium, read-only memory (ROM), random-access memory (RAM), erasable programmable memory (e.g., EPROM and EEPROM), flash memory, or another now-known or later-developed non-transitory type of medium that is suitable for storing information.

Although the operations of the circuit(s) and block(s) herein are shown and described in a particular order, in some embodiments, the order of the operations of each circuit/block may be altered so that certain operations may be performed in an inverse order or so that certain operation may be performed, at least in part, concurrently and/or in parallel with other operations. In other embodiments, instructions or sub-operations of distinct operations may be performed in an intermittent and/or alternating manner.

In the foregoing specification, the disclosure has been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A wireless device comprising:
a transmitter to generate a sampled stream of data for a packet at a first sample rate, and to generate a marker at a location in a data pattern in a frame delimiter of the packet;
a data re-sampling circuit coupled to the transmitter, the data re-sampling circuit comprising:
a re-timer engine to determine, using a fractional conversion ratio between the first sample rate and a crystal oscillator (XO)-integer-divided sample rate, a plurality of re-timer values comprising differences between pulses of a pseudo-clock corresponding to the XO-integer-divided sample rate and closest corresponding pulses of a clock corresponding to the first sample rate; and
a time-shifting circuit to re-sample data values of the sampled stream of data associated with locations of the plurality of re-timer values:
a comparator circuit coupled to the data re-sampling circuit, the comparator circuit to use the re-sampled data values to match the re-sampled data values to a corresponding data value detected in the data pattern in the frame delimiter of the packet; and
a timing logic coupled to the comparator circuit to use the plurality of re-timer values and the location of the marker in the data pattern in a timing calculation.

2. The wireless device of claim 1, wherein the XO-integer-divided sample rate averages a fraction of a frequency of an integer-divided XO sample rate and the first sample rate is a non-integer sample rate.

3. The wireless device of claim 1, wherein the time-shifting circuit comprises a plurality of digital fractional delay filters that re-sample, using the pseudo-clock, the data values based on corresponding ones of the plurality of re-timer values.

4. The wireless device of claim 1, wherein the data re-sampling circuit further comprises a pseudo-clock generator to generate the pseudo-clock, the pseudo-clock generator to:
receive a phase-locked loop (PLL) clock that is derived based on the clock;
insert a pulse from the PLL clock in response to each insertion command from the re-timer engine; and
generate the pseudo-clock comprising the PLL clock with the inserted pulses, the pseudo-clock corresponding to, on average, the XO-integer-divided sample rate.

5. The wireless device of claim 4, wherein the re-timer engine is further to:
send an insertion command to the pseudo-clock generator.

6. The wireless device of claim 4, wherein the re-timer engine comprises:
a register to store a re-timer value of the plurality of re-timer values; and
a summing circuit to add the fractional conversion ratio to the re-timer value to determine a fractional re-timer value.

7. The wireless device of claim 1, wherein, to use the plurality of re-timer values and the location of the marker in the data pattern in the timing calculation, the timing logic is to:
modify the location of the marker in the data pattern using the plurality of re-timer values.

8. The wireless device of claim 1, wherein the marker corresponds to a time of departure annotation, wherein the time of departure annotation is to be used in determining a round trip time value in frame synchronization detection.

9. A method of operating a wireless device that comprises a transmitter, a data re-sampling circuit coupled to the transmitter, a comparator circuit coupled to the data re-sampling circuit, and a timing logic coupled to the comparator circuit, wherein the method of operating the wireless device comprises:
generating, by the transmitter, a sampled stream of data for a packet at a first sample rate;
generating, by the transmitter, a marker at a location in a data pattern in a frame delimiter of the packet:
determining, by the data re-sampling circuit using a fractional conversion ratio between the first sample rate and a crystal oscillator (XO)-integer-divided sample rate, a plurality of re-timer values comprising a difference between pulses of a pseudo-clock corresponding to the XO-integer-divided sample rate and closest corresponding pulses of a clock corresponding to the first sample rate;
re-sampling, by the data re-sampling circuit, data values of the sampled stream of data associated with locations of the plurality of re-timer values;
matching, by the comparator circuit using the re-sampled data values, the re-sampled data values to a corresponding data value detected in the data pattern in the frame delimiter of the packet; and
using, by the timing logic, to the plurality of re-timer values and the location of the marker in the data pattern in a timing calculation.

10. The method of claim 9, wherein the XO-integer-divided sample rate averages a fraction of a frequency of an integer-divided XO sample rate and the first sample rate is a non-integer sample rate.

11. The method of claim 9, wherein the method of operating the wireless device further comprises re-sampling, using a plurality of fractional delay filters and the pseudo-clock, the data values based on corresponding ones of the plurality of re-timer values.

12. The method of claim 9, wherein the method of operating the wireless device further comprises:
receiving, by the data re-sampling circuit, a phase-locked loop (PLL) clock that is derived based on the clock;
inserting a pulse from the PLL clock in response to each insertion command received from a re-timer engine; and
generating, by the data re-sampling circuit, the pseudo-clock comprising the PLL clock with the inserted pulses, wherein the pseudo-clock corresponds to, on average, the XO-integer-divided sample rate.

13. The method of claim 12, wherein the method of operating the wireless device further comprises:
sending, by the re-timer engine, an insertion command to a pseudo-clock generator comprised by the re-sampling circuit.

14. The method of claim 12, wherein the method of operating the wireless device further comprises:
storing a re-timer value of the plural of re-timer values in a register; and
adding, by a summing circuit, to determine a fractional re-timer value, the fractional conversion ratio to the re-timer value.

15. The method of claim 9, wherein the method of operating the wireless device further comprises:
modifying, by the timing logic, the location of the marker in the data pattern using the plurality of re-timer values.

16. The method of claim 9, wherein the marker corresponds to a time of departure annotation, wherein the time of departure annotation is to be used in determining a round trip time value in frame synchronization detection.

17. A system comprising:
an antenna; and
a wireless device adapted to gain access to a secured enclosure by transmitting data comprising a frame delimiter using the antenna, the wireless device comprising:
a transmitter to generate a sampled stream of data for a packet at a first sample rate, and to generate a marker at a location in a data pattern in a frame delimiter of the packet;
a data re-sampling circuit coupled to the transmitter, the data re-sampling circuit comprising:
a re-timer engine to determine, using a fractional rate between the first sample rate and a crystal oscillator (XO)-integer-divided sample rate, a plurality of re-timer values comprising a difference between pulses of a pseudo-clock corresponding to the XO-integer-divided sample rate and closest corresponding pulses of a clock corresponding to the first sample rate; and
a time-shifting circuit to re-sample data values of the sampled stream of data associated with locations of the plurality of re-timer values;
a comparator circuit coupled to the data re-sampling circuit, the comparator circuit to use the re-sampled data values to match the re-sampled data values to a corresponding data value detected in the data pattern in the frame delimiter of the packet; and
a timing logic coupled to a receiver to use the plurality of re-timer values and the location of the marker in the data pattern in a timing calculation.

18. The system of claim 17, wherein the XO-integer-divided sample rate averages a fraction of a frequency of an integer-divided XO sample rate and the first sample rate is a non-integer sample rate.

19. The system of claim 17, wherein the time-shifting circuit comprises a plurality of digital fractional delay filters that re-sample, using the pseudo-clock, the data values based on corresponding ones of the plurality of re-timer values.

20. The system of claim 17, wherein, to use the plurality of re-timer values and the location of the marker in the data pattern in the timing calculation, the timing logic is to:

modify the location of the marker in the data pattern using the plurality of re-timer values.

* * * * *